Sept. 10, 1940.   A. H. R. FEDDEN ET AL   2,214,669
AIR-COOLED AIRCRAFT ENGINE
Filed Oct. 19, 1938   3 Sheets-Sheet 1

Inventors
Alfred H. R. Fedden
John W. Copley
Peter Fortescue
By Wilkinson & Mawhinney
Attorneys.

Sept. 10, 1940. A. H. R. FEDDEN ET AL 2,214,669
AIR-COOLED AIRCRAFT ENGINE
Filed Oct. 19, 1938  3 Sheets-Sheet 2
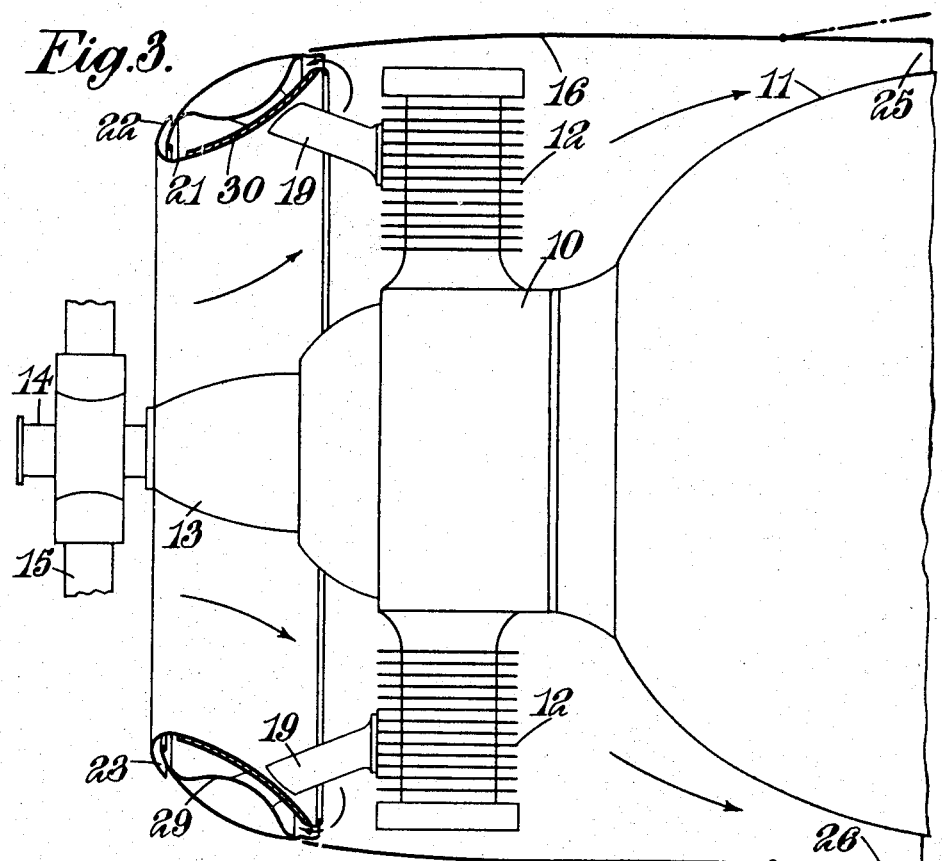
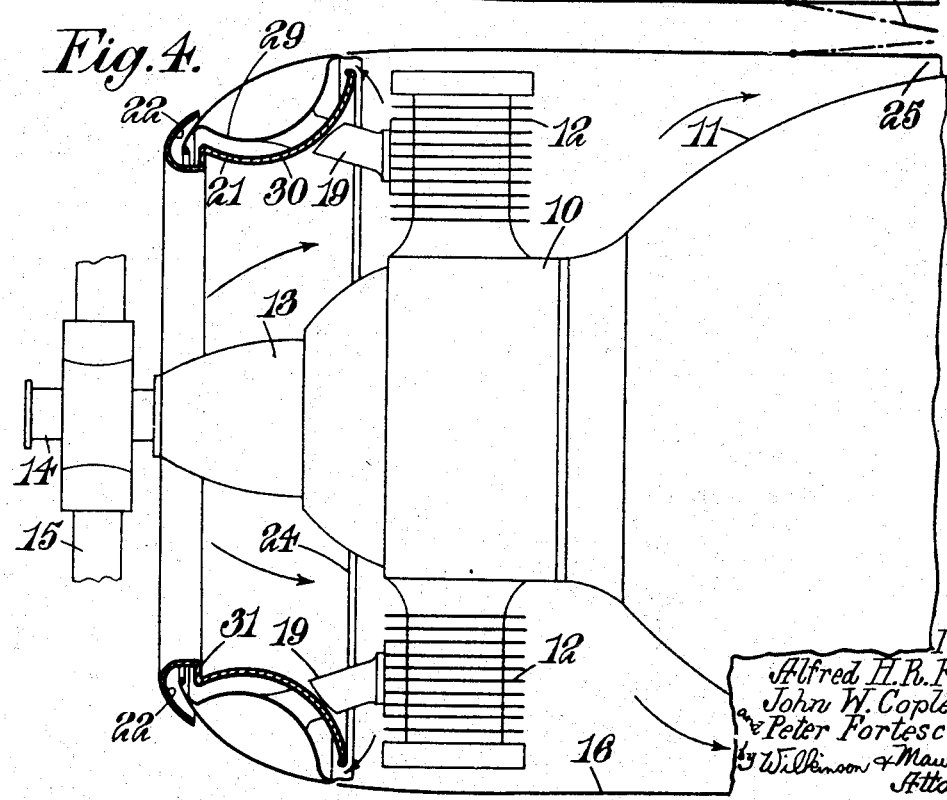

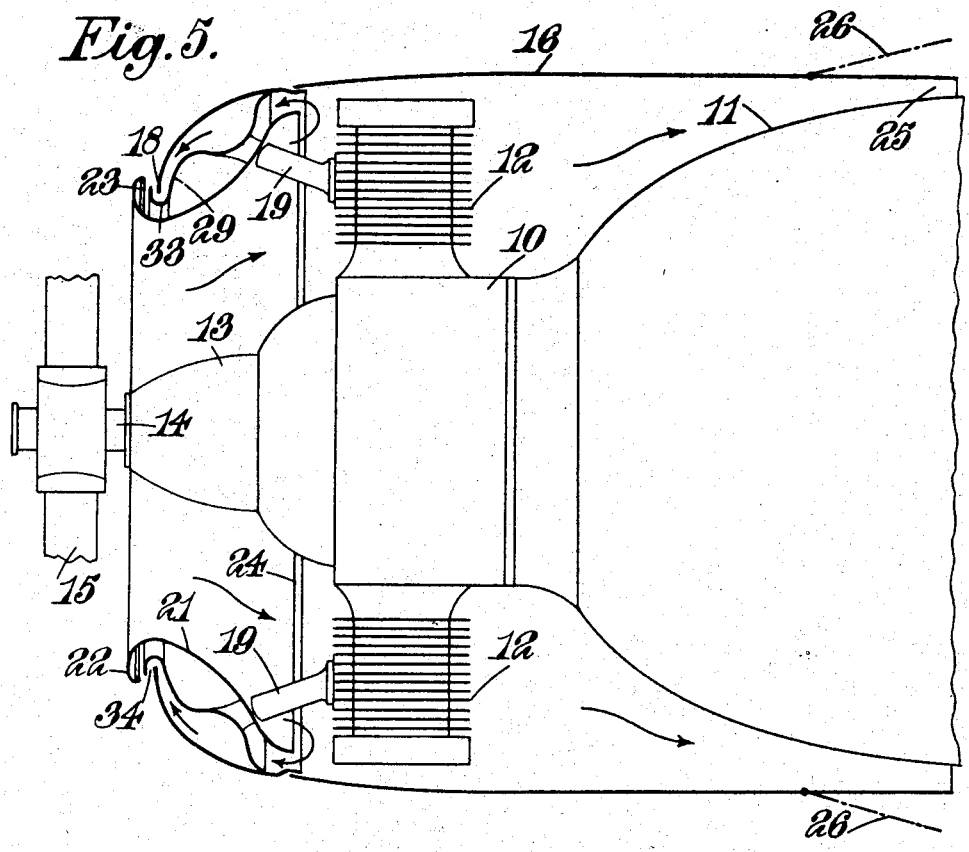

Patented Sept. 10, 1940

2,214,669

UNITED STATES PATENT OFFICE

2,214,669

AIR-COOLED AIRCRAFT ENGINE

Alfred Hubert Roy Fedden, John William Copley, and Peter Fortescue, Bristol, England, assignors to The Bristol Aeroplane Company Limited, Bristol, England, a British company Application October 19, 1938, Serial No. 235,878 In Great Britain October 27, 1937

1 Claim. (Cl. 123—171)

This invention is for improvements in cooling arrangements for aircraft engines and is concerned with engines of the kind having radially-arranged air-cooled cylinders surrounded by a streamlined cowl into which cooling air enters through a front orifice.

In an engine of this kind the external air-flow over the cowl causes variations in pressure over the surface of the cowl. The disposition of high pressure and low pressure regions depends upon various factors such as the shape of the cowl and conditions of flight but, in general, the pressure at the edge of the front orifice and within the orifice is positive (that is to say, above atmospheric), and at a short distance behind and radially outwards beyond this edge the pressure at the outside of the cowl is negative (that is to say, below atmospheric). Passing outwardly and rearwardly along the surface of the cowl the air pressure soon reaches a maximum negative value and then changes gradually until, at the trailing edge of the cowl, it is substantially equal to atmospheric pressure. As an example, it may be mentioned that at a flight speed of 300 M. P. H., in one installation, the maximum pressure within the inlet orifice has been found to be 40 inches of water above atmospheric and the lowest pressure, which is beyond the edge of this orifice, usually 40 inches of water below atmospheric.

It has heretofore been proposed to discharge the cooling air from the cowl at the region of low pressure above described, so that the cooling air flows in through the front inlet orifice, rearwardly around the cylinders and is then constrained by suitable baffles to flow forwardly to a discharge orifice situated at a region of low pressure as above described; however, in such proposals the exhaust-gas collector has been situated at the rear of the engine so that the cooling air became heated between its flow rearwardly and its flow forwardly.

One object of the present invention is to remove the above disadvantage and another object is to provide an improved constructional form of exhaust-collector, and improved cooling for the exhaust-collector.

According to the present invention, an air-cooled internal-combustion engine, for aircraft, comprises a surrounding cowl having an inlet orifice at the front for cooling air, an exhaust gas-collector situated in front of the engine cylinders, a partition to isolate the incoming air from the exhaust-collector and an air outlet at a point of low pressure near the front end of the cowl whereby some of the air is caused to return and flow in contact with the exhaust-collector.

In cowled air-cooled engines in which the exhaust-collector is arranged within the cowl and in front of the engine cylinders, the air flowing into the cowl is liable to become heated by the exhaust-collector before reaching the cylinders. For a given mass flow of air the rate of cooling of a hot surface is proportional to the fourth power of the temperature difference between the cooling air and the surface. It will be seen, therefore, that a reduction in the temperature of the air reaching the parts of the engine to be cooled will greatly increase the cooling effect. For example, an increase in the temperature difference from 200° C. to 230° C. will increase the rate of heat transfer, for a given mass flow of air, by 75%. Consequently, isolating the incoming cooling air from the heat of the exhaust greatly improves the cooling of the engine and enables either the air flow for a given engine to be reduced or the same air flow to be used for cooling a more powerful engine.

It has also been heretofore proposed to discharge all the cooling air from the cowl of a cowled air-cooled engine at a region of low pressure near the front end of the cowl so that the cooling air flows in through the front inlet orifice, rearwardly around the bases of the cylinders and is then constrained to flow forwardly to the front discharge orifice aforesaid. Such a proposal suffers from the defect that the cooling air flowing around the cylinder-heads has already been heated in passing around the bases of the cylinders. Moreover, in such proposed arrangements, the exhaust-collector was disposed within the cowl in rear of the cylinders so that heat from the exhaust gases further increases the temperature of the cooling air flowing to the cylinder-heads.

According to a further feature of the invention, the said partition and the adjacent wall of the cowl constitute between them a chamber containing the exhaust-collector within it, into which chamber cooling air enters at the rear and is discharged at the front; the exhaust-collector may thus be spaced away on all sides from the walls of said chamber whereby the exhaust-collector is surrounded by the cooling air.

The said exhaust-collector, in this form of the invention, is preferably a ring of circular cross-section. Alternatively, the outer wall of the exhaust-collector may be constituted by, or may lie in contact with, the adjacent wall of the cowl whereby the returned cooling air flows adjacent to only the inside wall of the exhaust-collector.

Specific embodiments of the invention will now be described, by way of example, with reference to the accompanying diagrammatic drawings, in which:

Figures 2, 3 and 4 are alternative forms of the invention, being modifications of that shown in Figure 1, and Figure 5 shows yet another modification in which the exhaust gases are discharged into the stream of cooling air.

Throughout the several figures of the drawings, like parts are denoted by the same reference numerals, and the flow of cooling air is indicated by arrows.

Figure 1:
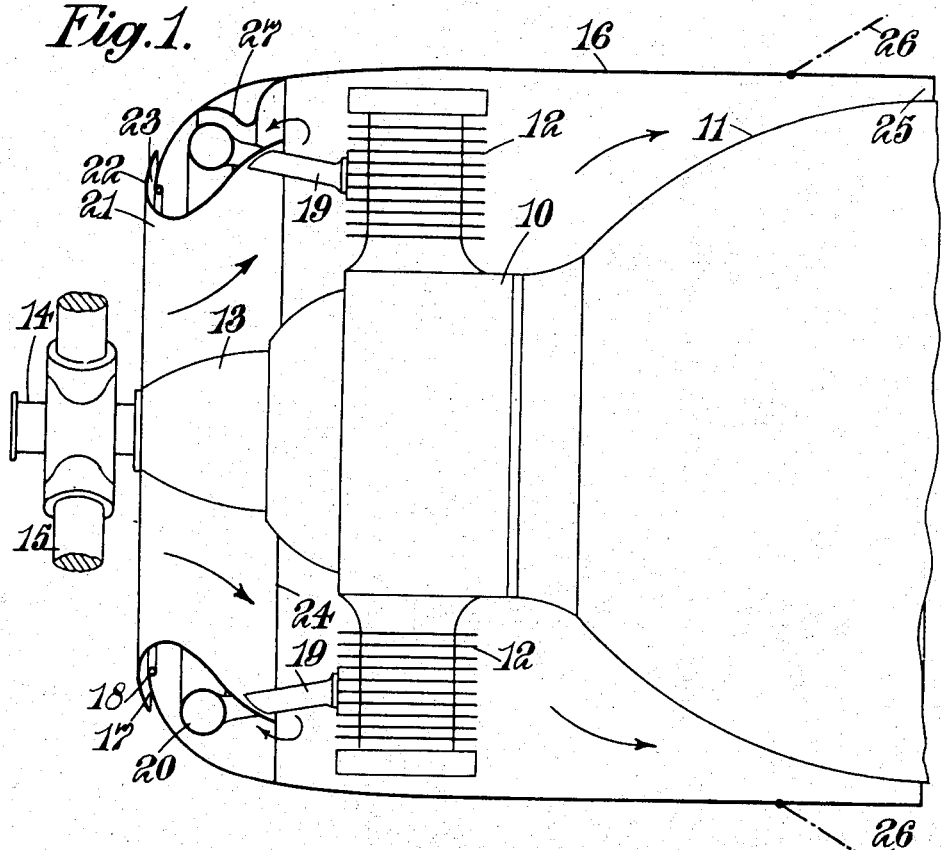
Figure 1 is a sectional elevation through the cowl and exhaust-collector of a radial-cylinder air-cooled aircraft engine, in which some of the cooling air is discharged through a rear outlet orifice and some of the air through a front outlet orifice.

As shown first in Figure 1, a radial-cylinder internal-combustion engine 10 is carried by a suitable mounting 11 which may, for example, form an extension or enlargement from the wing of an aeroplane. The engine comprises a number of radially-arranged air-cooled cylinders 12 only two of which are shown. At the front of the crankcase the engine carries gearing within a conoidal casing 13 from which the airscrew-shaft 14 protrudes forwardly and carries an airscrew 15.

The engine is surrounded by a streamlined cowl 16 which, as regards its external form, is of usual design, the front end of the cowl being turned in to form a lip 17 which is strengthened by a bead 18. Each cylinder 12 has fitted to its exhaust ports pipes 19 which convey the exhaust gases from the cylinders to an exhaust ring 20 which, according to the invention, is of plain circular cross-section and is also circular when viewed from the front. It will be seen that the exhaust ring 20 is spaced away from the inside of the cowl 16.

Between the casing 13 and the exhaust ring 20 there is a curved plate 21 which constitutes the partition above referred to. This partition starts with an out-turned and rearwardly-extending lip 22 which is spaced forwardly by a short distance from the front lip 17 of the cowl so as to leave a narrow annular discharge orifice 23. The partition then passes rearwardly and outwardly so that its rear edge 24 lies behind the exhaust ring 20, suitable apertures being formed in the partition to accommodate the pipes 19. It will be seen that the partition 21 is also spaced away from the exhaust ring 20 so that the partition and the front part of the cowl constitute between them a hollow chamber within which the exhaust ring 20 is contained, the exhaust ring being spaced away on all sides from the walls of the chamber.

When the aircraft is in flight, as has already been explained, the air pressure at the annular orifice within the partition 21 is above atmospheric pressure whereas the pressure at an annular zone of slightly greater radius than the partition is at a pressure below atmospheric. There is thus a tendency for air to flow rearwardly into the cowl through the orifice within the partition 21 and for air within the cowl to flow forwardly outside the partition 21 and out through the annular discharge orifice 23 above described.

In the arrangement of Figure 1 it is intended that the majority (for example, 70%–90%) of the cooling air which enters the front annular orifice shall be discharged through a rear annular orifice 25 after passing around and cooling the cylinders 12. The size of the orifice 25 may be controlled in known manner by adjustable flaps 26 such as are described in United States Patent No. 2,098,947 dated November 16, 1937. The size of the orifice 25 is so adjusted, in relation to conditions of flight, that the remaining air (for example, 30%–10%) is discharged forwardly through the chamber above described which contains the exhaust ring 20 and out through the annular discharge orifice 23 at the front of the cowl. In flowing through this chamber the air flows around the exhaust ring 20 on all sides of it whereby not only is the exhaust ring effectively cooled, but the air entering the cowl inside the partition 21 is insulated from heat which would otherwise be imparted to it from the exhaust ring.

A further advantage of the arrangement shown in Figure 1 is that the wall of the cowl 16 is not subjected to abrupt temperature changes between one point in its chord and another. Moreover, the plain toric shape of the exhaust ring renders it simple to construct and stronger than exhaust rings of non-circular cross-section.

In order to ensure that the air entering the chamber containing the exhaust ring shall flow uniformly around the exhaust ring, the cowl may be fitted internally with a suitably shaped deflector such as the deflector 27 shown at the top of Figure 1. Alternatively, it may be found that no such deflector is necessary, in which case the internal surface of the cowl may be left plain at this point as shown in the bottom half of Figure 1.

In addition to, or instead of, the adjustment made possible by the flaps 26, the size of the discharge orifice 23 at the front of the cowl may be adjusted by any suitable means, not shown in the drawings. In any event, it is preferred to maintain the rear discharge orifice 25 permanently open so that the main body of cooling air, unheated by contact with the exhaust system, passes rearwardly and out through the said orifice. Only such quantity of air as is required to cool the exhaust ring is discharged through the front orifice 23.

Certain parts of the partition 21 may be lagged with asbestos or the like in a manner described below with reference to Figures 3 and 4.

Figure 2:
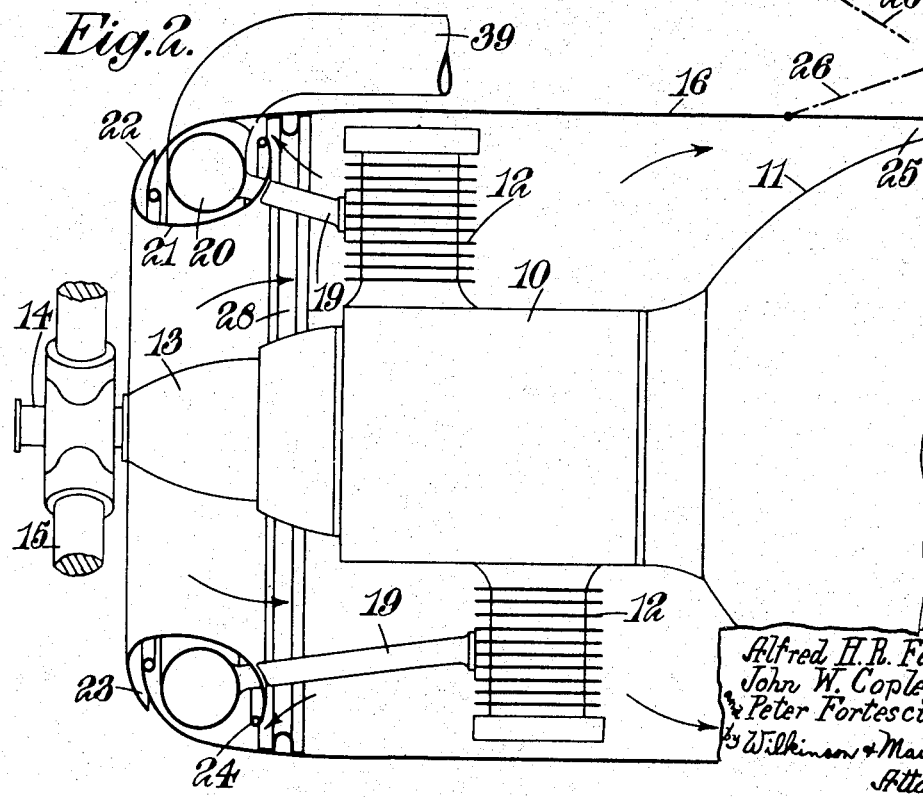

The proportions of the various parts may vary according to the power of the engine and other factors. For example, as shown in Figure 2, the exhaust ring 20 may be considerably larger in cross-section where it has to serve the cylinders of a two-bank engine. Figure 2 also shows an alternative shape for the partition 21; the lip 22 may be adjustable so as to adjust the size of the discharge orifice 23. The trailing edge 24 of the partition, as shown in Figure 2, may also extend outwardly to a substantial radius so as to leave only a narrow annular orifice through which the forwardly flowing cooling air can enter the chamber containing the exhaust ring. The rear edge 24 may be beaded as shown in order to give it the requisite strength.

In the arrangement of Figure 2, it may or may not be necessary to provide a deflector immediately in rear of the partition 21. Where such a deflector is required, it may take the form of the U-shaped ring 28 which also serves to strengthen the cowl at this point.

The manner in which the gas may be discharged from the ring 20 is illustrated in Figure 2 in which the front end of a tail-pipe 39 is shown leading from the ring 20 and through a suitable aperture in the wall of the cowl 16; a plurality of tail-pipes may be arranged at suitable intervals around the cowl. Similar tail-pipes may be provided in the arrangements of Figures 1, 3 and 4, but an arrangement whereby the tail-pipes may be dispensed with is described below with reference to Figure 5.

In the alternative arrangement of Figure 3 the exhaust ring is constituted by a curved plate 29 affixed to the inside of the cowl 16 near its leading edge. In this form of the invention, the partition 21 may be approximately similar to that described with reference to Figure 1, having an out-turned and rearwardly-extending lip 22 at its forward edge so as to provide a narrow annular discharge orifice 23 for the air which flows forwardly through the cowl. The front portion of the cowl and the plate 29 may be constructed as one unit which is subsequently attached to the rear part of the cowl. In the arrangement of Figure 3, as in the case of Figures 1 and 2, a certain proportion of the air which enters at the front orifice within the partition 21 reverses its direction of flow within the cowl and passes into the space between the curved plate 29 and the partition 21. This air cools the exhaust ring and insulates the air entering the central orifice from the heat of the exhaust ring. To improve the insulation the rear part of the partition 21 may carry a layer 30 of asbestos or other suitable material on either its internal or external surface.

In the alternative arrangement of Figure 4 the lip-portion 22 of the partition 21 is connected to the partition by a stepped portion 31 which provides a narrow space between the partition and the exhaust ring 29 at this point, whereby the cooling air in the exhaust ring chamber is constrained to flow with substantially uniform velocity over the exhaust-collector. The layer 30 of asbestos, which is preferably arranged on the inside of the partition, may be extended forwardly and outwardly so as to cover the stepped portion 31 and the lip 22.

The arrangement of Figure 4 may be modified as shown in Figure 5 by making the curved plate 29 separate from the wall of the cowl at its front end. As shown, the curved plate 29 is formed at its front edge with a U-shaped extension 33 which is spaced away from the front lip 18 of the cowl so as to permit the exhaust gases to escape through a narrow annular orifice 34. In front of the U-shaped extension 33 the front lip 22 of the partition 21 is provided as before so that, as the exhaust gases are discharged from the orifice 34, they immediately mix with the cooling air discharged from the orifice 23. The cooling air reduces the temperature of the exhaust gases sufficiently and it will be clear that this arrangement has the advantage that the tail-pipes (such as 39 in Figure 2) are no longer necessary.

We claim:

A cowl, for an air-cooled aircraft engine, which is formed with an inlet orifice at the front of the cowl for cooling air and an outlet orifice near the front of the cowl through which a part, only, of the said air is discharged, and in which a partition and a wall of the cowl are spaced apart to form a chamber near the front of the cowl through which chamber the air passes on its way from the interior of the cowl to the said front outlet orifice, comprising an exhaust collecting ring of circular cross-section so arranged within said chamber as to be spaced away on all sides from said partition and said wall whereby the exhaust-collecting ring is surrounded by said air.

ALFRED HUBERT ROY FEDDEN.
JOHN WILLIAM COPLEY.
PETER FORTESCUE.